US008506818B2

(12) United States Patent
Klipper et al.

(10) Patent No.: US 8,506,818 B2
(45) Date of Patent: Aug. 13, 2013

(54) METHOD FOR PRODUCING CHELATE RESINS

(75) Inventors: Reinhold Klipper, Köln (DE); Michael Schelhaas, Köln (DE)

(73) Assignee: LANXESS Deutschland GmbH, Leverkusen (DE)

( * ) Notice: Subject to any disclaimer, the term of this patent is extended or adjusted under 35 U.S.C. 154(b) by 350 days.

(21) Appl. No.: 12/669,968

(22) PCT Filed: Jul. 11, 2008

(86) PCT No.: PCT/EP2008/059055
§ 371 (c)(1), (2), (4) Date: May 25, 2010

(87) PCT Pub. No.: WO2009/013149
PCT Pub. Date: Jan. 29, 2009

(65) Prior Publication Data
US 2010/0252506 A1    Oct. 7, 2010

(30) Foreign Application Priority Data

Jul. 23, 2007 (DE) .......................... 10 2007 034 732

(51) Int. Cl.
*B01D 53/14* (2006.01)
(52) U.S. Cl.
USPC ................ 210/684; 95/133; 521/32; 528/422
(58) Field of Classification Search
USPC ............. 210/684; 528/422; 521/32; 95/133
See application file for complete search history.

(56) References Cited

U.S. PATENT DOCUMENTS

| 2,675,359 A | | 4/1954 | Schneider |
| 4,031,038 A | | 6/1977 | Grinstead et al. |
| 4,098,867 A | * | 7/1978 | Grinstead et al. ............... 423/24 |
| 4,317,887 A | * | 3/1982 | Warshawsky et al. .......... 521/38 |
| 4,382,124 A | | 5/1983 | Meitzner et al. |
| 4,419,245 A | | 12/1983 | Barrett et al. |
| 4,427,794 A | | 1/1984 | Lange et al. |
| 4,444,961 A | | 4/1984 | Timm |
| 5,141,965 A | * | 8/1992 | Pike ............................... 521/32 |
| 5,414,020 A | | 5/1995 | Heller et al. |
| 6,329,435 B1 | * | 12/2001 | Klipper et al. .................. 521/33 |
| 6,649,663 B1 | | 11/2003 | Klipper et al. |
| 7,265,159 B2 | * | 9/2007 | Klipper et al. .................. 521/31 |
| 7,708,892 B2 | * | 5/2010 | Klipper et al. ................. 210/683 |
| 2005/0004240 A1 | * | 1/2005 | Klipper et al. .................. 521/25 |
| 2005/0004241 A1 | * | 1/2005 | Kunimi et al. .................. 521/56 |

FOREIGN PATENT DOCUMENTS

| DE | 99587 | | 8/1973 |
| EP | 0046535 B1 | | 4/1984 |
| EP | 481603 A1 | * | 4/1992 |
| JP | 60011231 A | | 1/1985 |
| WO | 9312167 | | 6/1993 |
| WO | WO-2007-088010 A1 | * | 8/2007 |

OTHER PUBLICATIONS

International Search Report from co-pending Application PCT/EP2008/059066 dated Jul. 11, 2008, pages.
Hirayama, N. et al: "Ion Chromatogaphy using a charged complex anion-exchange group" Analytica Chimia Acta, 409(1-2) pp. 17-26, CODEN: ACACAM; ISSN: 0003-2670, 2000 XP-002526164.
Hering, R: "Chelatbildende Ionenaustauscher [Chelate-forming Ion Exchangers]", Akademie Verlag, Berlin, 1967 pp. 150-157.
Xuemin Chen, et al., Journal of East China Normal University Natural Science Edition, No. 2, pp. 74-77 (1985).

* cited by examiner

*Primary Examiner* — Peter D. Mulcahy
*Assistant Examiner* — Henry Hu
(74) *Attorney, Agent, or Firm* — Nicanor A. Kohncke

(57) ABSTRACT

The present invention relates to a method of producing novel chelate resins based on crosslinked polymer beads starting with methacrylic compounds, containing aminomethyl groups and/or aminomethyl nitrogen heterocyclic groups as functional groups, that have a high uptake capacity for heavy metals and rapid kinetics.

8 Claims, No Drawings

METHOD FOR PRODUCING CHELATE RESINS

CROSS REFERENCE TO RELATED PATENT APPLICATIONS

The present patent application claims the right of priority under 35 U.S.C. §119 (a)-(d) and 35 U.S.C. §365 of International Application No. PCT/EP2008/059055, filed 11 Jul. 2008, which was published in German as International Patent Publication No. WO 2009/013149 A2 on 29 Jan. 2009, which is entitled to the right of priority of German Patent Application No. DE 10 2007 034 732.6 filed on 23 Jul. 2007

The present invention relates to a method of producing novel chelate resins based on crosslinked polymer beads prepared from methacrylic compounds containing aminoalkyl groups and/or aminoalkyl nitrogen heterocyclic groups as functional groups that have a high uptake capacity for heavy metals.

For a relatively long time, use has been made of ion exchangers for removing valuable metals and heavy metals such as tin, cobalt, nickel, copper, zinc, lead, uranium, bismuth, vanadium, elements of the platinum group such as ruthenium, osmium, iridium, rhodium, palladium, platinum, and also the noble metals gold and silver, in particular from aqueous solutions. For this purpose, in addition to cation exchangers or anion exchangers, use is also preferably made of chelate resins.

The use of chelate resins for removing heavy metals or valuable metals is described, for example, in R. Hering, Chelatbildende Ionentauscher [Chelate-forming Ion Exchangers], Akademie Verlag, Berlin, 1967, pages 150 to 157. Mention is made, inter alia, of chelate resins containing iminoacetic acid groups. Chelate resins in many cases exhibit a significantly higher selectivity for heavy metals than, for example, cation exchangers containing strongly acidic sulphonic acid groups.

The customary ion exchangers take up heavy metals from aqueous solutions at pH>4. At pHs less than approximately 4, the selectivity of chelate resins for heavy metals decreases, since their functional groups are protonated. However, the removal of heavy metals from solutions or suspensions having strongly acid pHs in the range from about 4 to about 1 is of considerable technical interest.

For the recovery of heavy metals, rocks are treated with sulphuric acid. The valuable metals are dissolved out of the rock and are present in the strongly acidic rock-sulphuric acid suspension. In addition to the valuable metals, the rocks frequently also contain iron which is frequently present in dissolved form as iron 3+ ion. Ion exchangers take up iron 3+ ions readily without, however, subsequently releasing them to the same extent on regeneration of the ion exchanger. Iron ions therefore block the exchange capacity of the ion exchanger.

Ion exchangers are sought which can selectively take up valuable metals from acidic solutions or suspensions.

U.S. Pat. Nos. 4,098,867 and 4,031,038 describe chelate resins which bear methylaminopyridine groups.

They are produced by halomethylating polymer beads based on styrene and divinylbenzene, wherein, on average, 0.1 to 1.0 halomethyl groups are introduced per aromatic ring as a reactive group for adding the aminomethylpyridine chelate functionality.

Restricting the degree of halomethylation of the polymer beads also restricts the amount of aminomethylpyridine groups in the chelate resin and therefore the exchange capacity of the chelate resin.

It was an object of the present invention to provide a highly functionalized high-capacity chelate resin which effectively adsorbs valuable metals from aqueous solutions even in the presence of iron ions.

The solution of the object and therefore subject matter of the present invention are monodisperse or heterodisperse chelate resins containing aminoalkyl groups and/or aminoalkyl nitrogen heterocyclic groups as functional groups characterized in that these are produced on the basis of crosslinked polymer beads of methacrylic compounds by reaction with diamines and subsequent functionalization with halomethyl nitrogen heterocycles.

In a preferred embodiment, the present invention relates to a method of producing chelate exchangers containing aminomethyl groups and/or aminomethyl nitrogen heterocyclic groups, characterized in that a) monomer droplets of at least one methacrylic compound, at least one polyvinylaromatic compound and/or one multifunctional ethylenically unsaturated compound and one initiator or an initiator combination and also optionally a porogen are reacted to give crosslinked polymer beads, b) these crosslinked polymer beads are reacted with liquid diamines, and c) the aminated polymer beads are reacted with halomethyl nitrogen heterocycles to form chelate exchangers containing aminomethyl groups and/or aminomethyl nitrogen heterocyclic groups.

According to the invention, the chelate exchangers obtainable after stage c) have functional groups of the structures -alkyl-NR$_2$ and/or -alkyl-N(P)$_x$, wherein R is hydrogen or a methyl group and P is methyl and/or a methyl nitrogen heterocyclic radical, X is 1, 2 or 3 and alkyl is ethyl and propyl.

The chelate exchangers of the invention have a gel-like or a macroporous structure.

In method step a), use is made of at least one methacrylic compound and at least one polyvinylaromatic compound and/or one multifunctional ethylenically unsaturated compound. However, it is also possible to make use of mixtures of two or more methacrylic compounds with, where appropriate, additional monovinylaromatic compounds and mixtures of two or more polyvinylaromatic compounds.

As methacrylic compounds in the meaning of the present invention, in method step a), use is preferably made of acrylic acid esters or methacrylic acid esters containing branched or unbranched $C_1$-$C_6$ alkyl radicals. Particularly preferably, use is made of acrylic acid methylesters, acrylonitrile or methacrylonitrile.

Preferred polyvinylaromatic compounds in the meaning of the present invention are, for method step a), multifunctional ethylenically unsaturated compounds, particularly preferably divinylbenzene, divinyltoluene, trivinylbenzene, divinylnaphthalene, trivinylnaphthalene, 1,7-octadiene, 1,5-hexadiene, ethylene glycol dimethacrylate, trimethylolpropane trimethacrylate or allyl methacrylate.

The polyvinylaromatic compounds are preferably used in amounts of 1-20% by weight, particularly preferably 2-12% by weight, especially preferably 4-10% by weight, based on the monomer or its mixture with further monomers. The type of the polyvinylaromatic compounds (crosslinkers) is chosen with respect to the later use of the polymer beads. Divinylbenzene is especially preferred in many cases. For most applications, commercial divinylbenzene qualities which, in addition to the isomers of divinylbenzene, also contain ethylvinylbenzene, are adequate.

In a preferred embodiment of the present invention, in method step a) use is made of microencapsulated monomer droplets, wherein for the microencapsulation of the monomer droplets, materials known for use as complex coacervates come into consideration, in particular polyesters, natural and synthetic polyamides, polyurethanes, polyureas.

As natural polyamide, use is preferably made of gelatine. This is used in particular as coacervate and complex coacervate. Gelatine-containing complex coacervates, in the meaning of the invention, are taken to mean especially combinations of gelatines with synthetic polyelectrolytes. Suitable synthetic polyelectrolytes are copolymers having built-in units of, for example, maleic acid, acrylic acid, methacrylic acid, acrylamide and methacrylamide. Particularly preferably use is made of acrylic acid and acrylamide. Gelatine-containing capsules can be cured using customary curing agents such as, for example, formaldehyde or glutardialdehyde. The encapsulation of monomer droplets with gelatine, gelatine-containing coacervates and gelatine-containing complex coacervates is described in detail in EP-A 0 046 535. The methods of encapsulation with synthetic polymers are known. For example, phase boundary condensation is very suitable, in which a reactive component, preferably an isocyanate or an acid chloride dissolved in monomer droplets is reacted with a second reactive component, preferably an amine which is dissolved in the aqueous phase.

The optionally microencapsulated monomer droplets contain an initiator or mixtures of initiators to start the polymerization. Suitable initiators for the method of the invention are preferably peroxy compounds, particularly preferably dibenzoyl peroxide, dilauroyl peroxide, bis(p-chlorobenzoyl)peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and also azo compounds, particularly preferably 2,2'-azo-bis(isobutyronitrile) or 2,2'-azobis(2-methylisobutyronitrile).

The initiators are preferably used in amounts of 0.05 to 2.5% by weight, particularly preferably 0.1 to 1.5% by weight, based on the monomer mixture.

As further additives to the optionally microencapsulated monomer droplets, porogens can optionally be used in order to generate a macroporous structure in the spherical polymer. Organic solvents are suitable therefor which dissolve or swell the resultant polymer poorly. Preferably mention may be made of hexane, octane, isooctane, isododecane, methyl ethyl ketone, butanol or octanol and its isomers. Without the addition of porogen, gel-like chelate resins are obtained.

The expressions microporous or gel-type or macroporous have already been described extensively in the specialist literature. Preferred polymer beads in the meaning of the present invention, produced by method step a), have a macroporous structure.

The polymer beads of method step a) may be used in heterodisperse or monodisperse bead size distribution. Heterodisperse polymer beads show bead diameters in the region of 100μ to 2000μ.

Monodisperse in the present application designates those polymer beads or chelate resins in which at least 90% by volume or mass of the particles have a diameter which is in the interval having the width of ±10% of the most frequent diameter around the most frequent diameter.

For example, in the case of polymer beads having the most frequent diameter 0.5 mm, at least 90% by volume or mass are in a size interval between 0.45 mm and 0.55 mm, in the case of a substance having the most frequent diameter 0.7 mm, at least 90% by volume or mass are in a size interval between 0.77 mm and 0.63 mm.

The most common bead diameter of monodisperse polymer beads of method step a) is in the range from 100μ to 2000μ.

According to the invention, the monodispersity of polymer beads in step a) is obtained by nozzle-injection (jetting) or by seed-feed methods. For example, such methods and monodisperse ionic exchangers to be produced therefrom are described in U.S. Pat. No. 4,444,961, EP-A 0 046 535, U.S. Pat. No. 4,419,245 or WO 93/12167.

The formation of macroporous polymer beads can proceed, for example, by addition of inert materials (porogens) to the monomer mixture during polymerization. Suitable materials as such are especially organic substances which dissolve in the monomer, but dissolve or swell the polymer poorly (precipitants for polymers) for example aliphatic hydrocarbons (Farbenfabriken Bayer DBP 1045102, 1957; DBP 1113570, 1957).

In U.S. Pat. No. 4,382,124 as porogen, use is made of, for example, alcohols having 4 to 10 carbon atoms for producing monodisperse, macroporous polymer beads based on styrene/divinylbenzene. In addition, an overview is given of production methods of macroporous polymer beads.

The optionally microencapsulated monomer droplets can optionally also contain up to 30% by weight (based on the monomer) of crosslinked or noncrosslinked polymer. Preferred polymers are derived from the abovementioned monomers, preferably from styrene.

The mean particle size of the optionally encapsulated monomer droplets is 10-1000 μm, preferably 100-1000 μm. In the production of the monodisperse polymer beads according to method step a), the aqueous phase can optionally contain a dissolved polymerization inhibitor. Inhibitors within the meaning of the present invention which come into consideration are both inorganic and organic substances. Examples of inorganic inhibitors are nitrogen compounds such as hydroxylamine, hydrazine, sodium nitrite and potassium nitrite, salts of phosphorus acid such as sodium hydrogen phosphite and also sulphur compounds such as sodium dithionite, sodium thiosulphate, sodium sulphite, sodium bisulphite, sodium rhodanide and ammonium rhodanide. Examples of organic inhibitors are phenolic compounds such as hydroquinone, hydroquinone monomethyl ether, resorcinol, pyrocatechol, tert-butylpyrocatechol, pyrogallol and condensation products of phenols with aldehydes. Further suitable organic inhibitors are nitrogen compounds. These include hydroxylamine derivatives such as, for example, N,N-diethylhydroxylamine, N-isopropylhydroxylamine and also sulphonated or carboxylated N-alkylhydroxylamine or N,N-dialkylhydroxylamine derivatives, hydrazine derivatives such as, for example, N,N-hydrazinodiacetic acid, nitroso compounds such as, for example, N-nitrosophenylhydroxylamine, N-nitrosophenylhydroxylamine ammonium salt or N-nitrosophenylhydroxylamine aluminium salt. The concentration of the inhibitor is 5-1000 ppm (based on the aqueous phase), preferably 10-500 ppm, particularly preferably 10-250 ppm.

Polymerization of the optionally microencapsulated monomer droplets to give the spherical monodisperse polymer beads proceeds, as mentioned above, preferably in the presence of one or more protective colloids in the aqueous phase. Suitable protective colloids are natural or synthetic water-soluble polymers, such as, for example, gelatine, starch, poly(vinyl alcohol), polyvinylpyrrolidone, polyacrylic acid, polymethacrylic acid or copolymers of (meth) acrylic acid and (meth)acrylic esters. Very highly suitable compounds are also cellulose derivatives, in particular cellulose esters and cellulose ethers, such as carboxymethylcellulose, methylhydroxyethylcellulose, methylhydroxypropylcellulose and hydroxyethylcellulose. A particularly highly suitable compound is gelatine. The usage rate of the protective colloids is generally 0.05 to 1% by weight, based on the aqueous phase, preferably 0.05 to 0.5% by weight.

The polymerization to give the macroporous polymer beads in method step a) can optionally also be carried out in the presence of a buffer system. Preference is given to buffer systems which set the pH of the aqueous phase at the start of polymerization to a value between 14 and 6, preferably between 12 and 8. Under these conditions protective colloids are present with carboxyl groups whole or partly as salts. In this manner, the action of the protective colloids is favourably influenced. Particularly highly suitable buffer systems contain phosphate salts or borate salts. The expressions phosphate and borate within the meaning of the invention also comprise the condensation products of acids and salts corresponding to the ortho forms. The concentration of the phosphate or borate in the aqueous phase is 0.5-500 mmol/l, preferably 2.5-100 mmol/l.

The agitator speed during polymerization is thus critical and, in contrast to customary bead polymerization, does not have an effect on particle size. Low agitator speeds are employed which are sufficient to keep the suspended monomer droplets in suspension and to support the removal of the heat of polymerization. For this task, use can be made of various agitator types, particularly suitable agitators are axially-acting gate agitators.

The volume ratio of encapsulated monomer droplets to aqueous phase is preferably 1:0.75 to 1:20, particularly preferably 1:1 to 1:6.

The polymerization temperature depends on the decomposition temperature of the initiator used. It is generally between 50 and 180° C., preferably between 55 and 130° C. The polymerization lasts for 0.5 hour to a few hours. It has proven useful to employ a temperature programme in which the polymerization is started at low temperature, for example, 60° C., and the reaction temperature is increased with advancing polymerization conversion rate. In this manner, for example, the demands for a reliable reaction course and high polymerization conversion rate can be met very readily. After polymerization, the polymer is isolated with conventional methods, for example by filtration or decanting, and optionally washed.

The crosslinked heterodisperse base polymer according to method step a) and aminolysis thereof with polyamines according to method step b) are described in U.S. Pat. No. 2,675,359, DD 99587 or U.S. Pat. No. 5,414,020.

The crosslinked polymer beads which are to be produced according to method step a) and are based on (meth)acrylic compounds are aminated in method step b) in such a manner that the polymer beads are reacted either with dimethylaminopropylamine or with other diamines such as ethylenediamine, diethylenetriamines, triethylenediamines.

Other amines in the meaning of the present invention which preferably come into consideration are ethylenediamine, 1-amino-3-dimethylaminopropane, triethylenetetramine, diethylenetriamine, tetraethylenepentamine, pentaethylenehexamine and other partially methylated derivatives.

The polyamines are used in molar excess, based on the ester or nitrile groups to be aminolysed, preferably in amounts of 1.1-8 mol of polyamine per mole of ester or nitrile groups, in particular 2 to 6 mol of polyamine per mole of ester or nitrile groups.

The aminolysis can be carried out at temperatures of 80 to 250° C., preferably 135 to 200° C. The reaction time is generally selected to be such that the nitrite or ester groups are reacted quantitatively; the yield of amide groups which is achievable is at least 80%, preferably at least 90%, in particular at least 95% (the remainder are reacted to form carboxyl groups).

In the case of amination with 1-amino-3-dimethylaminopropane, anion exchangers having tertiary amino groups are obtained directly. In the case of amination with diamines such as diethylene-triamine, anion exchangers having primary amino groups are obtained which can be converted into tertiary amino groups by alkylation.

The production of monodisperse polymer beads according to method step a) and aminolysis thereof with polyamines according to method step b) is described, for example in US 2005/0004240 A1.

In method step c), the ion exchanger of the invention is produced by reacting the aminoalkyl-containing monodisperse or heterodisperse, crosslinked polymer beads from step b) in aqueous suspension with chloromethylpyridine or its hydrochloride, or with 2-chloromethylquinoline or 2-chloromethylpiperidine.

Chloromethylpyridine or its hydrochloride can be used as 2-chloromethylpyridine, 3-chloromethylpyridine or 4-chloromethylpyridine.

As preferred reagent, use is made in method step c) of 2-chloromethylpyridine hydrochloride, preferably in aqueous solution.

In a preferred embodiment, the reaction in method step c) is carried out with the addition of alkali, particularly preferably potassium hydroxide solution or sodium hydroxide solution, especially preferably sodium hydroxide solution. By addition of alkali in the reaction of the aminoalkyl-containing, crosslinked basic polymer from method step b) in aqueous suspension with halomethylnitrogen heterocycles, preferably picolylchloride or its hydrochloride, the pH is maintained in the reaction in the range 4-10. Preferably, the pH is maintained in the range 6-9.

In the context of the present invention it has been found that the conversion rate of said reaction in method step c) considerably depends on the pH of the suspension present in the reaction. For instance, according to the invention, the highest conversion rate and therefore the highest yield are achieved at pHs of 4-10, preferably at pHs of 6-9, in particular at pHs around 7.

The reaction according to method step c) preferably proceeds in the temperature range of 40 to 100° C., particularly preferably in the temperature range of 50 to 80° C.

The ion exchangers which are produced according to the invention and have chelating functional groups are suitable for the adsorption of metals, in particular heavy metals and noble metals, and their compounds, from aqueous solutions and organic liquids, preferably from acidic aqueous solutions. The ion exchangers which are produced according to the invention and have chelating groups are suitable particularly for removing heavy metals or noble metals from aqueous solutions, in particular from aqueous solutions of alkaline earth metals or alkali metals, from brines of alkali metal chloride electrolysis, from aqueous hydrochloric acids, from wastewaters or flue gas scrubbers, but also from liquid or gaseous hydrocarbons, carboxylic acids such as adipic acid, glutaric acid or succinic acid, natural gases, natural gas condensates, mineral oils or halogenated hydrocarbons, such as chlorinated or fluorinated hydrocarbons, or fluoro/chlorocarbons. In addition, the ion exchangers of the invention are suitable for removing alkaline earth metals from brines such as are customarily used in alkali metal chloride electrolysis. The ion exchangers of the invention, however, are also suitable for removing heavy metals, in particular iron, cadmium or lead, from substances which are reacted during an electrolytic treatment, for example a dimerization of acrylonitrile to form adiponitrile.

The ion exchangers produced according to the invention are very particularly suitable for removing mercury, iron, chromium, cobalt, nickel, copper, zinc, lead, cadmium, manganese, uranium, vanadium, elements of the platinum group, gold or silver from the abovementioned solutions, liquids or gases.

In particular, the ion exchangers of the invention are suitable for removing rhodium or elements of the platinum group and also gold, silver or rhodium or noble metal-containing catalyst residues from organic solutions or solvents.

In addition to metallurgy for recovering valuable metals, the chelate exchangers having aminomethyl and/or aminoalkyl nitrogen heterocyclic groups are outstandingly suitable for the most varied fields of use in the chemical industry, the electronics industry, the waste disposal/recycling industry or the electroplating, electroforming or surface technology.

Analytical Methods

Determination of the amount of basic aminomethyl groups and/or aminoalkyl nitrogen heterocyclic groups in the crosslinked polystyrene polymer beads 100 ml of the aminomethylated polymer beads are vibrated on the tamping volumeter and subsequently flashed into a glass column using deionized water. In 1 hour and 40 minutes, 1000 ml of 2% by weight sodium hydroxide solution are filtered through. Subsequently deionized water is filtered through until 100 ml of eluate admixed with phenolphthalein have a consumption of 0.1 n (0.1 normal) hydrochloric acid or at most 0.05 ml.

50 ml of this resin are admixed with 50 ml of deionized water and 100 ml of 1 n hydrochloric acid in a glass beaker. The suspension is stirred for 30 minutes and subsequently charged into a glass column. The liquid is drained off. A further 100 ml of 1n hydrochloric acid is filtered through the resin in 20 minutes. Subsequently, 200 ml of methanol are filtered through. All eluates are collected and combined and titrated with 1n sodium hydroxide solution against methyl orange.

The amount of aminomethyl groups in 1 liter of aminomethylated resin is calculated from the following formula:
(200−V)·20=mol of aminomethyl groups per liter of resin.

Determination of the Amount of Methylpyridine Groups in the Chelate Resin 50 ml of moist aminomethylated polymer beads are dried to constant eight in vacuum at 70° C. in a drying cabinet.
50 ml weigh 14.78 gram dry.
100 ml of the methylpyridine-bearing chelate resin in the sulphate form from Example 1d) are charged into a column. From the top, 400 ml of 4% strength by weight aqueous sodium hydroxide solution are filtered through. Subsequently, from the top, deionized water, to extract the residual sodium hydroxide solution, is filtered through until the eluate has a pH<10.
50 ml of the resin thus treated are dried to constant weight at 70° C. in vacuum in a drying cabinet.
50 ml weigh 18.47 gram dry.

The total dry weight of aminomethylated polymer beads (300 ml) from Example 1c) is 88.73 gram.

Total dry weight of methylpyridine-bearing inert polymer beads in the free base form (555 ml) from Example 1d) is 205.04 gram.

205.04 gram−88.73 gram=116.31 gram.

The methylpyridine-bearing resin from Example 1d) contains 116.31 gram of methylpyridine groups, equivalent to 1.264 mol of methylpyridine.

300 ml of aminomethylated polymer beads from Example 1c) contain 300×2.17 =651 mmol of basic groups.

Each basic aminomethyl group contains two hydrogen atoms which can be replaced by methylpyridine groups.

1.264/0.651=1.94

On a statistical average, of the two hydrogen atoms, 1.94 are replaced by methylpyridine groups.

Deionized water in the meaning of the present invention is characterized by having a conductivity of 0.1 to 10 µS, with the content of dissolved or undissolved metal ions being no greater than 1 ppm, preferably no greater than 0.5 ppm for Fe, Co, Ni, Mo, Cr, Cu as individual components and no greater than 10 ppm, preferably no greater than 1 ppm, for the sum of the said metals.

EXAMPLES

Example 1

Ionac® A 365 from Lanxess Deutschland GmbH is a heterodisperse, macroporous anion exchanger based on crosslinked acrylic polymer beads containing diethylenetriamine groups.

a) Production of the Ion Exchanger Containing Chelating Groups

At room temperature, 300 ml of Ionac® A 365 were added to 200 ml of deionized water. The suspension was heated to 90° C. Subsequently, in the course of 4 hours, 415.7 g of an 80% strength by weight aqueous solution of picolyl chloride hydrochloride were added. At the same time, the pH of the suspension was kept at pH 7 by adding 50% strength by weight sodium hydroxide solution. The solution was then stirred for a further 6 hours at this temperature.

Thereafter the suspension was cooled. The resin was washed chloride-free with deionized water.

Consumption of 50% strength sodium hydroxide solution: 190 ml

Yield: 405 ml 25 ml of resin, dried, weigh 13.5 grams.

The resin was packed into a column and charged from the top with 1500 ml of 4% strength by weight of sodium hydroxide solution and converted to the free base form.

Resin volume: 395 ml

Calculation of the Amount of Methylpyridine Groups in the End Product 300 ml of Ionac® A 365, moist, weigh, dried, 113.7 grams.
395 ml of moist end product weigh, dried, 213.3 grams.

In the reaction of the starting material to give the end product a weight increase occurred of 213.3−113.7=99.6 grams.

The end product contained 99.6 grams of methylpyridine, equivalent to 1.24 mol of methylpyridine.

Example 2

Lewatit® OC 1072 from Lanxess Deutschland GmbH is a heterodisperse gel-type anion exchanger based on crosslinked acrylic polymer beads containing dimethylaminopropyl groups.

a) Production of the Ion Exchanger Containing Chelating Groups

At room temperature, 300 ml of Lewatit® OC 1072 were added to 200 ml of deionized water. The suspension was heated to 90° C. Subsequently, in the course of 4 hours, 212.8 g of an 80% strength by weight aqueous solution of picolyl chloride hydrochloride were added. At the same time, the pH of the suspension was held at pH 7 by addition of 50% strength by weight sodium hydroxide solution. Then the suspension was stirred for a further 6 hours at this temperature.

Thereafter the suspension was cooled. The resin was washed chloride-free with deionized water.

Yield: 450 ml 25 ml of resin dried weighed 6.8 grams.

The resin was packed into a column and charged from the top with 1500 ml of 4% strength by weight sodium hydroxide solution and converted to the free base form.

Resin volume: 500 ml

Calculation of the Amount of Methylpyridine Groups in the End Product 300 ml of Lewatit® OC 1072, moist, weigh, dried, 87.84 grams.

500 ml of moist end product weigh, dried, 136.0 grams.

In the reaction of the starting material to form the end product a weight increase occurred of 136.0−87.84=48.16 grams.

The end product contained 48.16 grams of methylpyridine, equivalent to 0.523 mol of methylpyridine.

The present invention has been described with reference to specific details of particular embodiments thereof. It is not intended that such details be regarded as limitations upon the scope of the invention except insofar as and to the extent that they are included in the accompanying claims.

As used in this specification and the appended claims, the singular forms "a," "an," and "the" include plural referents unless the content clearly dictates otherwise.

What is claimed is:

1. A method of producing a chelate exchanger containing aminomethyl nitrogen heterocyclic groups, comprising:
   a) polymerizing monomer droplets of (i) at least one (meth) acrylic compound, (ii) at least one polyvinylaromatic compound, and (iii) one multifunctional ethylenically unsaturated compound in the presence of an initiator, thereby forming crosslinked polymer beads,
   b) reacting the crosslinked polymer beads with at least one liquid diamine, thereby forming animated polymer beads; and
   c) further reacting, at a pH which is maintained in the range of 6 to 9, the aminated polymer beads with halomethyl nitrogen heterocycles thereby forming the chelate exchanger.

2. The method according to claim 1, wherein the monomer droplets contain at least one porogen and whereby upon the polymerization step, said resulting crosslinked polymer beads are macroporous.

3. The method according to claim 1, wherein the crosslinked polymer beads have a heterodisperse bead size distribution.

4. The method according to claim 1, wherein the monomer droplets are microencapsulated with a complex coacervate.

5. The method according to claim 1, wherein the polymerization step is carried out in the presence of a protective colloid.

6. The method according to claim 1, wherein said monomer droplets comprise at least one (meth)acrylic compound, said (meth)acrylic compound formed of an acrylic acid ester or methacrylic acid ester containing branched or unbranched $C_1$-$C_6$ alkyl radicals.

7. A chelate exchanger containing aminomethyl nitrogen heterocyclic groups obtained according to the process of claim 1.

8. The method according to claim 1, wherein the crosslinked polymer beads have a monodisperse bead size distribution.

* * * * *